No. 773,571. Patented November 1, 1904.

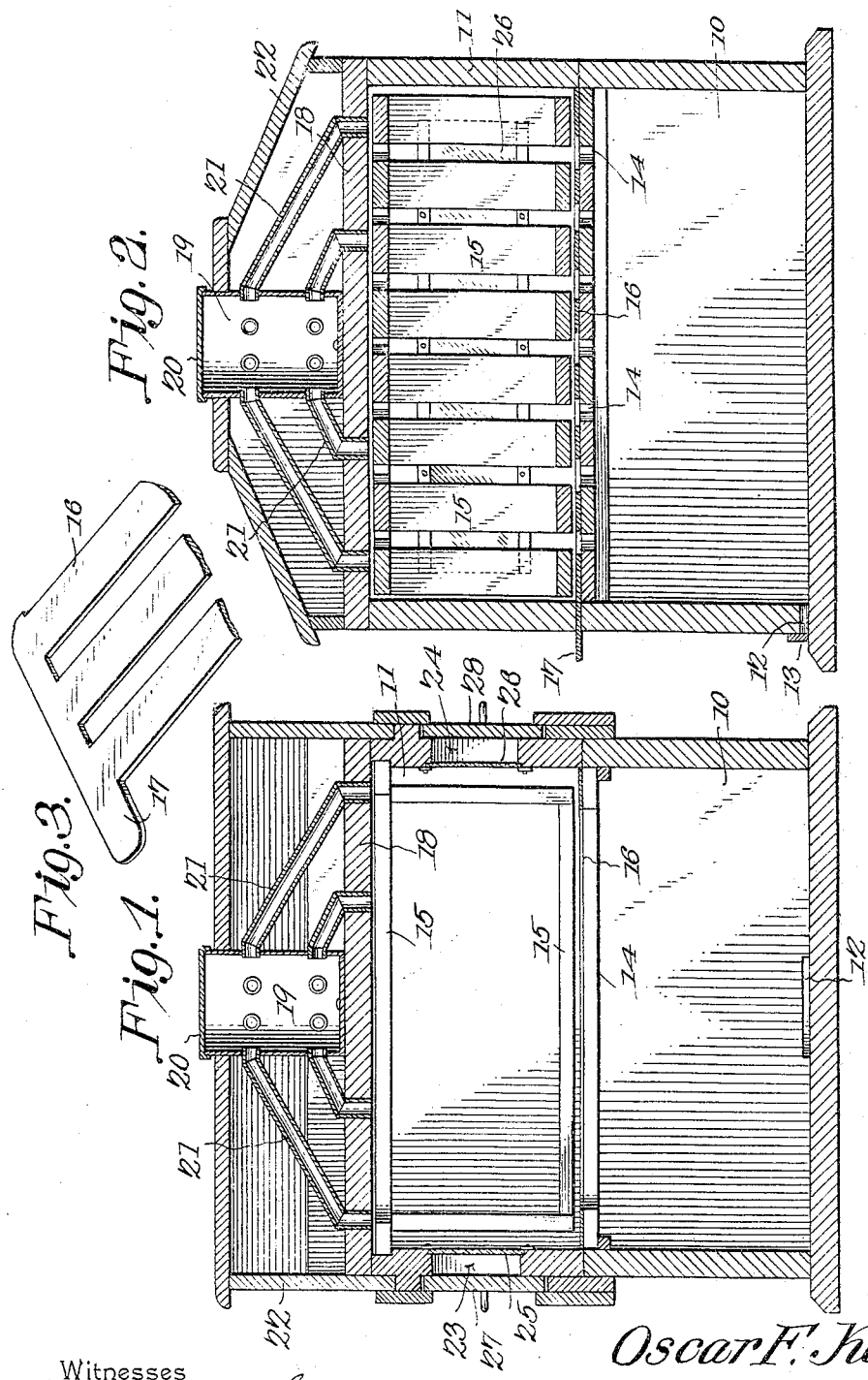

UNITED STATES PATENT OFFICE.

OSCAR F. KERR, OF POINT, TEXAS.

BEEHIVE.

SPECIFICATION forming part of Letters Patent No. 773,571, dated November 1, 1904.

Application filed May 14, 1904. Serial No. 207,977. (No model.)

*To all whom it may concern:*

Be it known that I, OSCAR F. KERR, a citizen of the United States, residing at Point, in the county of Rains and State of Texas, have invented a new and useful Beehive, of which the following is a specification.

This invention relates to beehives, and has for its object to improve the construction and produce a hive having means whereby the bees may be driven from one compartment to the other by the use of smoke and communication between the compartments shut off while the honey-frames are removed from the vacated compartment.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a longitudinal sectional elevation of a beehive embodying the improved construction. Fig. 2 is a transverse sectional elevation of the same. Fig. 3 is a perspective view of a portion of the valve detached.

The improved device comprises a lower or brooding chamber 10, an upper or comb-frame chamber 11, resting upon the brooding-chamber and detachable therefrom. These chambers may be of any desired size and shape, but will generally be of the usual size and of the usual material.

The brooding-chamber is provided with the usual inlet-aperture 12 for the bees, provided with a swinging closure 13 and with spaced elongated apertures 14 in its top, the lands between the apertures corresponding to the comb-frames 15, above which they rest, as shown. By this means communication is provided between the lower chamber and the upper chamber for the passage of the bees to each of the comb-frames.

Slidably disposed upon the top of the brooding-chamber is a valve member 16, having alternating spaced apertures and lands corresponding to the apertures and lands of the brooding-chamber for registration therewith, so that communication between the brooding and comb-frame chambers may be controlled, as will be obvious.

The valve member 16 is provided with lateral extensions 17 to provide means for operating the valve from the exterior of the hive.

The comb-frame chamber is provided with a detachable cover 18, and resting upon this cover member is a combustion-chamber 19, preferably in the form of a sheet-metal cylinder having a detachable cover 20. Leading from this combustion-chamber 19 are a plurality of radiating smoke-conductor tubes 21, passing through the cover member 18 and providing means for distributing smoke to the comb-frame chamber. The conductor-tubes will preferably be distributed over the area of the chamber 11 in such manner as to distribute the smoke uniformly therein.

The cover member 18 will preferably be provided with a housing 22 to cover and protect the chamber 19 and its tubes 21 and form a finish to the hive.

Transverse observation-apertures 23 24 will be formed in the side walls of the frame-chamber 11, covered with transparent closures 25 26, such as glass, and provided with closing-slides 27 28 to provide means for ascertaining the fact as to the presence of bees in the chamber.

With a device thus constructed when it is desired to remove the comb-frames or to replace the frames the chamber 19 will be supplied with smoke-producing material, which will pass to the chamber 11 and induce the bees to descend into the lower compartment, and when all have departed, which fact may be easily ascertained by opening the sliding covers 27 28, the valve 16 is closed to confine the bees within the chamber 10, the drop-door 13 having first been closed. The cover member 18 is then removed and the chamber 19 emptied of its smoke-producing material and the desired frames 15 removed or replaced, as required. By this means it is obvious that the bees may be driven into the lower compartment without injury and the operator enabled to remove the honey or replace the comb-frames without danger of exciting the bees or losing any of them or otherwise interfering with their labor, except to a limited extent, as will be obvious.

Having thus described the invention, what is claimed is—

1. A beehive comprising a brooding-chamber and a comb-frame chamber, means for preventing egress from the brooding-chamber, an apertured partition separating the two chambers, a valve provided with apertures adapted to be moved into and out of register with those of the partition thereby to cut off or establish communication between the two chambers, a cover for the comb-frame chamber, and smoke-distributing means carried by the cover.

2. A beehive comprising a brooding-chamber, a comb-frame chamber detachably supported thereon and communicating therewith, means operable from the exterior of the hive for controlling communication between the two chambers, a combustion-chamber, and a plurality of smoke-conductors leading from the combustion-chamber to the comb-frame chamber, and disposed to distribute the smoke uniformly therein.

3. A beehive comprising a brooding-chamber and a comb-frame chamber communicating therewith, means operable from the exterior of the hive for controlling communication between said chambers, a detachable closure to said comb-frame chamber, a combustion-chamber carried by said closure and smoke-conductors between said combustion-chamber and said comb-frame chamber.

4. A beehive comprising a brooding-chamber and a comb-frame chamber communicating therewith, means operable from the exterior of the hive for controlling communication between said chambers, a detachable closure to said comb-frame chamber, a combustion-chamber having a detachable cover and supported upon said closure to said comb-frame chamber, and a plurality of radiating smoke-conductors between said combustion-chamber and comb-frame chamber.

In testimony that I claim the foregoing as my own I have hereto affixed my signature in the presence of two witnesses.

OSCAR F. KERR.

Witnesses:
R. L. HEILFORD,
J. E. HAMOR.